US012771072B2

(12) United States Patent
Knaub et al.

(10) Patent No.: US 12,771,072 B2
(45) Date of Patent: Oct. 20, 2026

(54) SOCKET WITH AN ACTUATOR FOR GUIDING A LOCKING ELEMENT

(71) Applicant: PHOENIX CONTACT E-Mobility GmbH, Schieder-Schwalenberg (DE)

(72) Inventors: Witalij Knaub, Aerzen (DE); Dennis Sprenger, Lemgo (DE)

(73) Assignee: PHOENIX CONTACT E-MOBILITY, Schieder-Schwalenberg (DE)

( * ) Notice: Subject to any disclaimer, the term of this patent is extended or adjusted under 35 U.S.C. 154(b) by 734 days.

(21) Appl. No.: 18/253,596

(22) PCT Filed: Nov. 23, 2021

(86) PCT No.: PCT/EP2021/082686
§ 371 (c)(1),
(2) Date: May 19, 2023

(87) PCT Pub. No.: WO2022/106723
PCT Pub. Date: May 27, 2022

(65) Prior Publication Data
US 2024/0006818 A1 Jan. 4, 2024

(30) Foreign Application Priority Data
Nov. 23, 2020 (LU) ........................................ 102227

(51) Int. Cl.
*H01R 13/639* (2006.01)
*B60L 53/16* (2019.01)

(52) U.S. Cl.
CPC .......... *H01R 13/6397* (2013.01); *B60L 53/16* (2019.02); *H01R 2201/26* (2013.01)

(58) Field of Classification Search
CPC . H01R 13/6397; H01R 2201/26; B60L 53/16; Y02T 10/70; Y02T 10/7072; Y02T 90/14
(Continued)

(56) References Cited

U.S. PATENT DOCUMENTS 5,344,123 A * 9/1994 Hanano .............. B22D 17/2053
266/236
6,462,291 B1 * 10/2002 Sachs ..................... H01H 13/06
200/341
(Continued)

FOREIGN PATENT DOCUMENTS

CN 109997282 A 7/2019
DE 102012101094 A1 8/2013
(Continued)

OTHER PUBLICATIONS

DE 102012101094 B4 Original Document with Machine Translation (Year: 2022).*

*Primary Examiner* — M Baye Diao
(74) *Attorney, Agent, or Firm* — LEYDIG, VOIT & MAYER, LTD.

(57) ABSTRACT

A socket includes: a housing; and an actuator detachably mountable or mounted on an outside of the housing for actuating a locking element for locking the socket to a connector in a locking position. The housing includes a passage for guiding the locking element through the housing. The passage penetrates the housing and is arranged within a sealing region of the housing.

19 Claims, 8 Drawing Sheets

(58) Field of Classification Search
USPC .......................................................... 320/111
See application file for complete search history.

(56) References Cited

U.S. PATENT DOCUMENTS

| | | | | |
|---|---|---|---|---|
| 7,101,210 | B2 * | 9/2006 | Lin | H05K 7/12 439/73 |
| 7,679,673 | B2 * | 3/2010 | Takekuma | H04N 23/56 348/375 |
| 9,362,670 | B2 * | 6/2016 | Mo | H01R 13/639 |
| 9,595,790 | B1 * | 3/2017 | Cao | H01R 13/62911 |
| 2006/0166553 | A1 * | 7/2006 | Miyakawa | H01R 13/6272 439/587 |
| 2014/0111144 | A1 | 4/2014 | Mo | |
| 2014/0127924 | A1 | 5/2014 | Kim | |
| 2019/0047426 | A1 | 2/2019 | Effenberger et al. | |
| 2019/0363482 | A1 | 11/2019 | Kamemura | |
| 2021/0075160 | A1 | 3/2021 | Töpfer et al. | |

FOREIGN PATENT DOCUMENTS

| | | | | |
|---|---|---|---|---|
| DE | 102014100640 | A1 | 7/2015 | |
| DE | 102015116649 | A1 | 4/2017 | |
| DE | 102017130658 | A1 | 6/2019 | |
| DE | 102012101094 | B4 * | 3/2022 | H01R 13/6397 |
| EP | 2955793 | A1 | 12/2015 | |
| EP | 3680987 | A1 | 7/2020 | |
| JP | 2015103379 | A | 6/2015 | |
| JP | 2018026272 | A | 2/2018 | |

* cited by examiner

SOCKET WITH AN ACTUATOR FOR GUIDING A LOCKING ELEMENT

CROSS-REFERENCE TO PRIOR APPLICATIONS

This application is a U.S. National Phase application under 35 U.S.C. § 371 of International Application No. PCT/EP2021/082686, filed on Nov. 23, 2021, and claims benefit to Luxembourg Patent Application No. LU 102227, filed on Nov. 23, 2020. The International Application was published in German on May 27, 2022 as WO/2022/106723 under PCT Article 21(2).

FIELD

The invention relates to a socket, preferably a charging socket, having a housing and an actuator which can be or is detachably mounted on the outside of the housing. The invention further relates to an arrangement of a socket and a connector, as well as to a vehicle, preferably an electrically powered vehicle, with a socket.

BACKGROUND

In the field of electromobility, arrangements of charging connectors and charging sockets which have electromechanical safety systems are known from the prior art. Such a safety system serves to lock the charging connector with the charging socket during the charging process of an electric vehicle.

For example, the European patent application EP 2 955 793 A1 describes an arrangement of a charging connector and a charging socket for a vehicle. The charging socket is arranged on the vehicle side and, outside the sealing region, has a locking portion for locking with the charging connector. To illustrate the locking, an actuator is mounted at the charging socket in the side/edge region, outside of the housing of the charging socket. The actuator comprises an actuatable, cylindrical locking bolt which, in the locking state, blocks a locking clip of the charging connector in the locking portion during the plug-in connection between charging connector and charging socket.

A socket for an electric vehicle is known from the German disclosure document DE 10 2015 116 649 A1. In a lateral, flattened region of the connector face, the socket has a locking hole on the connector portion, that is to say on the contact socket with the contact elements. A locking pin of a charging connector can be inserted into the locking hole in order to lock the charging connector to the socket. In the region of the socket opposite the connector face, a contact guide is located on the outer housing wall opposite the position of the locking hole, to which contact guide a contact connector can be connected.

In the German disclosure document DE 10 2014 100 640 A1, a charging socket with is disclosed an actuating element module arranged laterally, that is to say on the outside of the housing of the charging socket, and an illumination module. The actuating element module is provided to lock a connector inserted into the charging socket in the charging socket during the charging process. This thereby takes place via an opening on the outside of the housing, on which the actuating element module is arranged. The actuating element module hereby guides a bolt through the opening into the interior of the housing.

Countries such as, for example, the People's Republic of China or the United States of America require—by means of corresponding standards (for example the GB/T 20234.2 standard and he SAE J-1772 standard)—safety systems with a locking pin or locking bolt. For such a locking mechanism, an actuator is located outside of and lateral to the housing of the charging socket in order to guide the locking pin or the locking bolt horizontally or vertically. The locking pin or the locking bolt is thereby not guided through the sealing region, or preferably the dry region, of the charging socket, in which electronic and/or electromechanical components and elements are located, for example, but rather is guided outside. In addition, the supplying of power to the actuators for actuating the locking pin or the locking bolt, as well as their activation, takes place by means of external and therefore additional electrical conductors. The position of the actuator frequently requires a relatively large amount of installation space, comparatively, especially in the case of combined AC/DC charging sockets.

Against the background of increasing requirements and increasing functions, charging sockets must, for example, increasingly accommodate further electrical and above all electronic components and elements, for example with the aid of circuit boards. This also includes the requirement for internal contacting and activation of the actuator of the securing mechanism.

SUMMARY

In an embodiment, the present invention provides a socket, comprising: a housing; and an actuator detachably mountable or mounted on an outside of the housing, and configured to actuate a locking element for locking the socket to a connector in a locking position, wherein the housing comprises a passage configured to guide the locking element through the housing, and wherein the passage is configured to penetrate the housing and is arranged within a sealing region of the housing.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
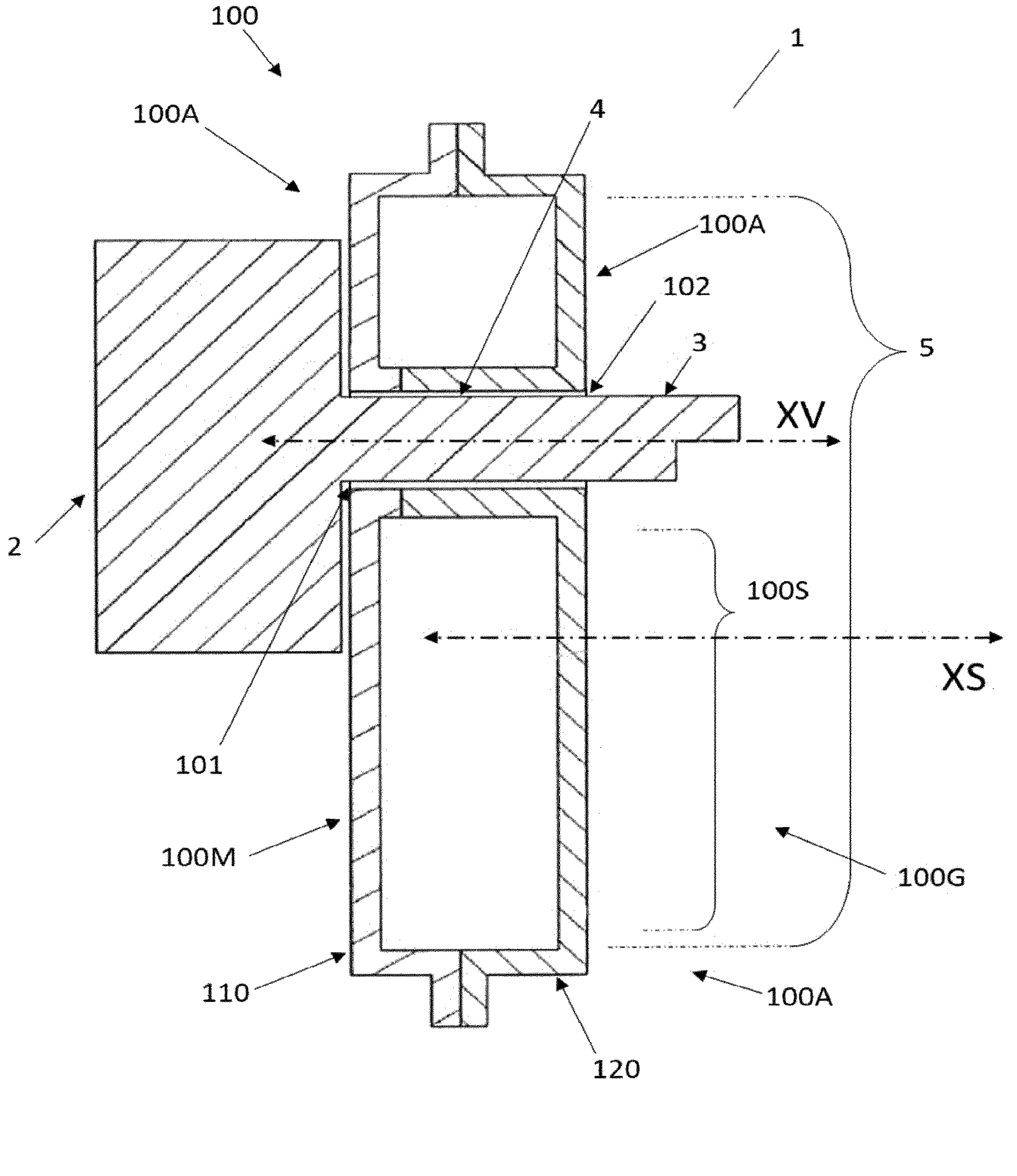
FIG. 1 shows a schematic representation of an exemplary embodiment of a socket according to the invention.

In an embodiment, the present invention provides an improved socket.

According to a first general aspect, the invention relates to a socket, preferably a charging socket, having a housing and an actuator that can be or is detachably mounted on an outside of the housing, preferably on an outside of the housing situated opposite the connector face of the socket, for actuating a locking element for locking the socket to a connector, preferably a charging connector, in a locking position, wherein the housing comprises a passage for guiding the locking element at least through the housing and/or beyond, wherein the passage is designed to penetrate the housing, preferably to form openings on the housing, and is arranged within a sealing region of the housing.

A socket can thereby be provided, for example, which is characterized by an optimized, preferably space-saving design. In other words, an improved utilization of the installation space is preferably ensured via the socket according to the invention.

The housing, and thus walls and/or wall sections of the housing, can preferably be formed at least in sections from an insulating material, preferably based on a plastic. The housing can be formed, for example, via at least one injection-molding process and/or via at least one casting process.

The actuator can be designed, for example, as an electromechanical 12 V locking actuator or as an electromechanical 24 V locking actuator.

The locking element can preferably be formed, at least in sections, as a cylindrical locking pin or as a cylindrical locking bolt, and can be configured or dimensioned such that, in the state of the locking of the socket with a connector, withstands withdrawal forces on the connecter up to, for example, approximately 150 N. In this way, unintentional or unauthorized withdrawal of the connector from the socket is preferably avoided. For example, the locking element can be made of a metallic material, or alternatively also of a non-metallic material of corresponding strength.

The locking position can preferably represent a position of the socket and of the connector, in which the socket and the connector form a connector connection, meaning that the connector is inserted into the socket, and preferably a state for enabling the transmission of electrical energy via this connector connection is present.

The passage can preferably be formed by walls and/or wall sections of the housing of the socket, preferably in the form of a tunnel or channel. The passage can extend, for example, in the plug-in direction of the socket from the outside, on which outside the actuator can be or is detachably mounted, to an opposite outside on which the connector face of the socket is located, and thus can penetrate the housing.

The passage can preferably be designed as a profile which is closed or at least sealed in the circumferential direction and penetrates the housing. For example, it is thereby ensured that no undesired harmful media such as, for example, dirt/dust or water pass via the passage into the interior of the housing. Furthermore, it is thereby ensured that the locking element does not come into contact with other components or elements within the housing of the socket.

According to a further aspect of the invention, it can be provided that the passage forms at least two openings on the outside of the housing, wherein the at least two openings are preferably arranged opposite one another.

The locking element can be inserted into the passage via an opening, preferably at the outside opposite the connector face of the socket, and can be guided in the passage in a translatory manner, preferably at least in sections, by means of the actuator.

Via a substantially rectilinear design of the passage with opposite openings on the outside of the housing, a simple and cost-effective manufacturing capability is ensured for the socket, for example. Furthermore, the locking element can thus be guided optimally, for example, and there is no hindrance or constraint of the locking element, preferably during the actuation and/or guidance in the passage.

According to a further aspect of the invention, it can be provided that the passage is designed to penetrate the housing, at least in sections, substantially parallel or oblique to the plug-in direction of the socket, preferably in the plug-in direction of at least one contact element for transmitting electrical energy and/or electrical signals; and/or the locking element is designed to be operable at least in sections substantially parallel or oblique to the plug-in direction of the socket.

For example, an easier manufacturability of the socket is thereby ensured.

Furthermore, it is thereby possible, for example, to provide connector sockets in a corresponding scope in different embodiments with different connector faces, each having an identical or at least nearly identical inner housing section, since only the cross section of the passage and/or the locking element must be configured and/or formed accordingly.

According to a further aspect of the invention, it can be provided that the sealing region is designed as a dry region, in which at least one contact element for transmitting electrical energy and/or electrical signals is arranged, at least in sections.

Due to isolation requirements, the sealing region can preferably be designed as a sealed region of the housing, and thus of the socket, which is preferably designed to be medium-tight, preferably liquid-tight and/or gas-tight, relative to the environment of the socket. For this purpose, the sealing region can have seals, for example based on plastomer or elastomer, for example at walls and/or wall portions of the housing, which seals contact at least in sections.

It can thereby be ensured, for example, that components and elements within the housing of the socket are protected primarily against harmful media, and thus damage to the socket as a whole is avoided.

According to a further aspect of the invention, it can be provided that the actuator can be or is detachably mounted and/or is arranged on the outside of the housing in a view, preferably in a side view in the connection direction of the socket, within the contour or the projection surface of the housing, preferably within the contour or the projection surface of the sealing region.

An installation space-optimized position of the actuator on the socket, and thus overall a compact design of the socket, can thereby be ensured.

According to a further aspect of the invention, it can be provided that the housing comprises a first housing part and a second housing part which can be or is detachably mounted on the first housing part, wherein the passage is designed to penetrate the first housing part and the second housing part.

The socket is thereby relatively simple to assemble and can also be dismantled again, for example. Electrical and/or electronic components and elements, for example at least one contact element at least in sections, can be accommodated or housed in a first housing part as a carrier housing part, for example, and the second housing part can be formed more or less as a cover housing part for the carrier housing part. The actuator preferably can be or is detachably mounted on the outside of the cover housing part.

It is possible that the socket comprises a seal at least in sections, and/or at least one seal, for forming the sealing region between the first housing part and the second housing part.

The seal can, for example, be designed as a correspondingly viscous sealant or as a sealing ring, preferably based on plastic.

It is possible that the actuator is operable and/or configured to be controllable and/or formed by at least one contact element of the socket.

For example, an external signal connection and/or power supply for the actuator by means of separate additional electrical conductors can thereby be dispensed with. The actuator can preferably be supplied with electrical energy and/or controlled via the electrical and/or electronic components and elements located in the socket.

According to a further aspect of the invention, it can be provided that the locking element is cylindrical or pin-shaped at least in sections.

The locking element can preferably be embodied, at least in sections, as a cylindrical locking pin or locking bolt. For example, a simpler guidance of the locking element into the passage and preferably beyond it, that is to say into a provided region on the connector for locking the socket to the connector in the state of the connector connection, is thereby enabled.

According to a further aspect of the invention, it can be provided that the housing has, on the outside, preferably on the outside opposite the connector face of the socket, a mounting portion, which is configured and/or designed for mounting an assembly, wherein the mounting portion is preferably arranged adjacent to the actuator.

For example, further or additional electrical and/or electronic components and elements now can be or are detachably mounted on the mounting portion, preferably by means of further housing parts.

It is possible that at least one seal is arranged between the actuator and the outside. The at least one seal can preferably be arranged or formed circumferentially around an opening of the passage.

It is thereby prevented, for example, that harmful media, such as for example water or dirt/dust, penetrate into the passage at the mounting point between actuator and housing and arrive at current-conducting components and elements via the passage and/or the locking element.

According to a further aspect of the invention, it can be provided that the passage is formed integrally as one piece, at least in sections, preferably integrally as one piece, at least in sections, with a first housing part and/or a second housing part, said passage preferably being formed from an insulating material.

According to a further aspect of the invention, it can be provided that the cross section of the passage is formed substantially round and/or oval and/or rectangular, at least in sections.

A second general aspect of the invention relates to an arrangement comprising a socket, preferably a charging socket, as disclosed herein, and a connector, preferably a charging connector.

So that the connector with the socket as disclosed herein can assume a connector connection and preferably a locking position with the socket, the connector is preferably designed in the form of a mating connector element with respect to the socket, and comprises at least one region or a section in which the locking element can lock the connector to lock the connector to the socket, preferably forming a detachable form-fitting connection.

A third general aspect of the invention relates to a vehicle, preferably an electrically powered vehicle, having a socket as disclosed herein.

To avoid repetition, features directed purely toward the device of the tool according to the invention and/or disclosed in conjunction therewith should also be considered to be disclosed and be able to be claimed in accordance with the method and vice versa.

Identical or functionally equivalent components or elements are denoted by the same reference signs in Figures. For the explanation thereof, reference is also made in part to the description of other exemplary embodiments and/or Figures in order to avoid repetitions.

The following detailed description of the exemplary embodiments illustrated in the figures serves for more detailed illustration or clarification and is not intended to limit the scope of the invention in any way.

FIG. 1 shows a schematic, i.e. simplified, representation (side sectional view) of an exemplary embodiment of a socket 1 according to the invention.

The socket 1 is preferably designed as a charging socket and can preferably be used in the field of electromobility. The socket 1 can therefore be part of an electrically powered vehicle, that is to say an electric vehicle (not shown in FIG. 1), and can serve as an interface for charging the electric vehicle with electrical energy.

The socket 1 comprises a housing 100. The housing 100 is preferably formed substantially and/or at least in sections from an electrically non-conductive material, that is to say an insulating material. The housing 100 has a first housing part 110 and a second housing part 120. In sections, the first housing part 110 contacts the second housing part 120 on end faces of wall portions that are configured and formed correspondingly to one another. Between the first housing part 110 and the second housing part 120, that is to say in the contact region, a seal (not shown in FIG. 1) for forming a sealing region 5 of the socket 1 is preferably arranged, which is explained in more detail below.

The first housing part 110 is preferably detachably connected, inter alia, by means of screw connections to the second housing part 120, or is detachably mounted thereto (not shown in FIG. 1).

The second housing part 120 has a connector face 100G. The connector face 100G comprises a connector portion 100S, in which are arranged components and elements for transmitting electrical energy and/or electrical signals.

The connector face 100G, and thus the connector portion 100S, is configured and designed to form a connector connection with a charging connector (not shown in FIG. 1). The connector direction between the charging connector and the socket 1 is denoted by "XS" in FIG. 1 and further Figures.

The first housing part 110 comprises, on the outside 100A, an actuator 2 which can be or is detachably mounted on the outside 100A. The actuator 2 is preferably designed as an electromechanical actuator and comprises a locking element 3. The locking element 3 is preferably designed as a locking pin or as a locking bolt, and therefore has a cylindrical contour at least in sections. The actuator 2 is configured and designed to set the locking element 3 in motion, at least in sections, linearly, that is to say in a translatory manner in the actuation direction of the locking element 3 characterized by "XV", and/or rotationally. By means of the locking element 3, a connector inserted into the socket 1 can be mechanically locked to form a preferably form-fitting connection, preferably during the transmission of electrical energy via the arrangement of the socket 1 with the connector, i.e., for example during a charging phase of an electric vehicle.

The actuator 2 is or can be detachably mounted on the housing 100, that is to say on the outside 100A of the first housing part 110, preferably by means of the formation of screw connections and, at least in sections, via plug connections, which is explained in more detail using further Figures.

The housing 100, and thus the first housing part 110 and the second housing part 120, have a passage 4 which is designed to penetrate the housing 100. The passage 4 can preferably be designed in the form of a tunnel or channel. In other words, the passage 4 extends from an outside 100A of the housing 100, preferably a rear side of the housing 100, through the housing 100, to an opposite outside 100A of the housing 100, preferably a connector face 100G of the housing 100. The passage 4 is provided, and accordingly designed, for guiding the locking element 3 through the housing 100 by means of the actuator 2.

The passage 4, that is to say corresponding walls and/or wall sections of the first housing part 110 and of the second housing part 120, are preferably designed such that a substantially cylindrical contour is formed, at least in sections, in order to guide the locking element 3 optimally, preferably virtually without play.

As shown in FIG. 1, the passage 4 travels or extends in or within the sealing region 5 of the housing 100 of the socket 1. In other words, the passage 4 is formed and/or arranged in a region of the socket 1, that is to say of the housing 100, in which in particular electrically conductive components and elements such as, for example, circuit boards or contact elements 6 (see FIG. 2) are accommodated at least in sections, or are arranged within the housing 100.

Figure 2:
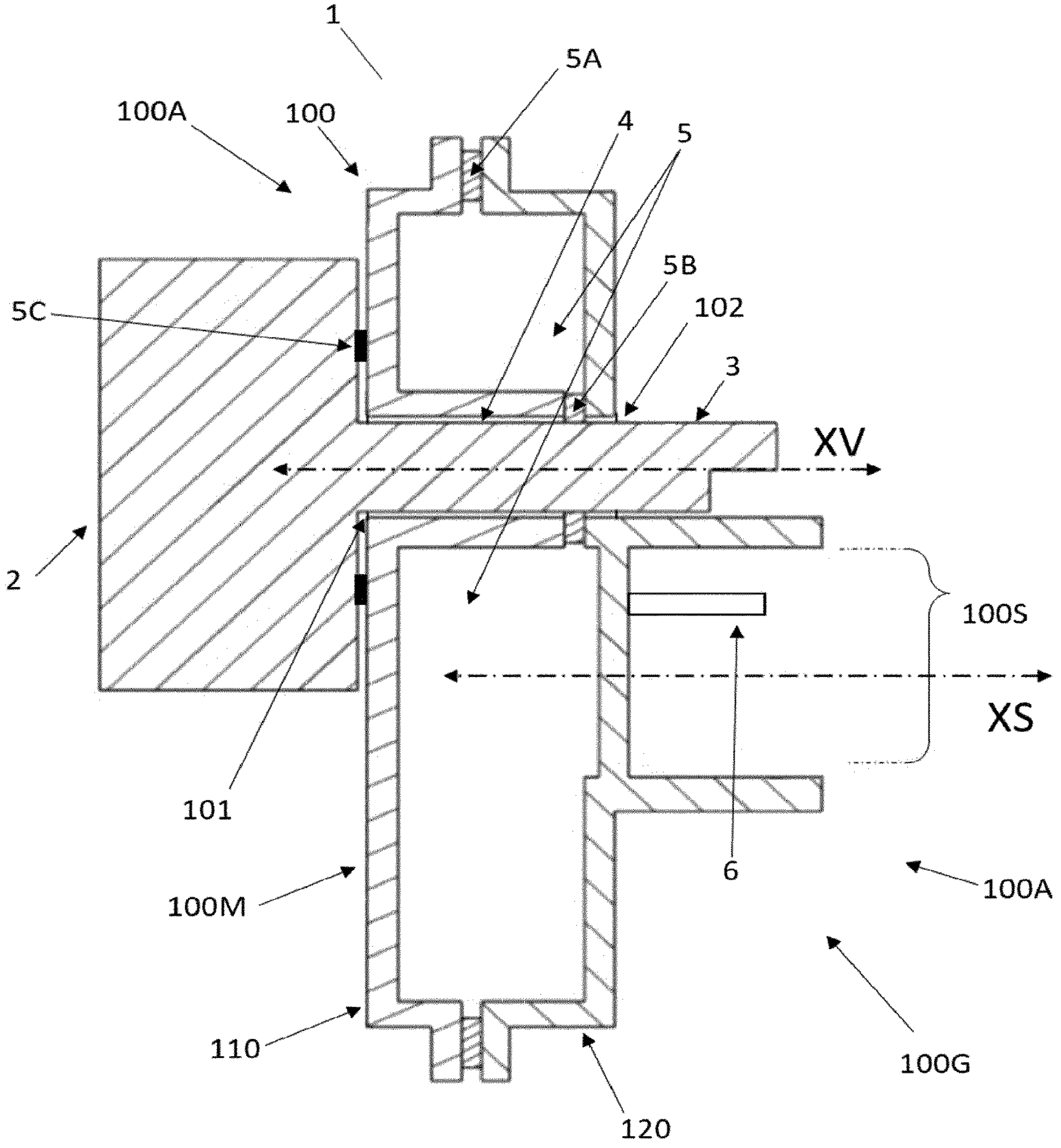
FIG. 2 shows a schematic representation of a further exemplary embodiment of a socket according to the invention.

FIG. 2 shows a schematic, i.e. simplified, representation (side sectional view) of a further exemplary embodiment of a socket 1 according to the invention.

A re-explanation of components and elements already described using FIG. 1 is omitted in part in order to avoid repetitions.

The socket 1 shown in FIG. 2—analogous to the socket 1 schematically depicted in FIG. 1—also comprises a housing 100 with a first housing part 110 and a second housing part 120. For the socket 1 in FIG. 2, primarily the connector section 100S of the connector face 100G of the second housing part 120 is clearly visible. Located within the connector portion 100S is at least one contact element 6 at least for transmitting electrical energy and/or electrical signals.

Located between the first housing part 110 and the second housing part 120 is a seal 5A on corresponding end faces of walls and/or wall sections, which seal 5A is shown with graphical emphasis in FIG. 2. The seal 5A can, for example, be formed from an elastomer, for example silicone. The seal 5A preferably runs between the first housing part 110 and the second housing part 120, along an outer contour of the housing 100.

The seal 5A, which is thus more or less circumferential within the socket 1, forms a sealing region 5, in which are arranged electrical components and elements to be protected.

The sealing region 5 of the socket 1, together with the first housing part 110 and the second housing part 120, is configured and designed such that no harmful media, for example dust/dirt, water etc., can penetrate into the interior of the socket 1.

The passage 4 of the socket 1 extends via the first housing part 110, from an outside 100A of the housing 100 and the second housing part 120 to an outside 100A of the housing 100, which has the connector face 100G with the connector portion 100S and accommodates the locking element 3 for guiding at least in portions in the passage 4.

At the fastening point between the first housing part 110 and the second housing part 120 in the region of the passage 4, a further seal 5B for said passage 4 is provided between the first housing part 110 and the second housing part 120. In addition, a further seal 5C can be arranged between the actuator 2 and the outside 100A of the housing 100, that is to say the first housing part 110, in order preferably to prevent the penetration of dirt/dust and/or water at this point.

Due to the arrangement and/or formation of the passage 4 within the sealing region 5 of the socket 1, and the correspondingly provided seals 5B, 5C, the locking of a connector in the state of forming a plug connection with the socket 1, and thus in a locking position, can take place without impairing the further components and/or elements within the socket 1.

As can also be seen from FIG. 2, the actuator 2 is preferably detachably connected to the housing 100 within the sealing region 5, on the outside 100A of the first housing part 110. In other words, in a view in the connector direction XS, the actuator 2 is located within the projection area of the socket 1, and preferably within the projection area of the sealing region 5. For example, a compact and space-saving design of the socket 1 is therewith ensured.

Figure 3A:
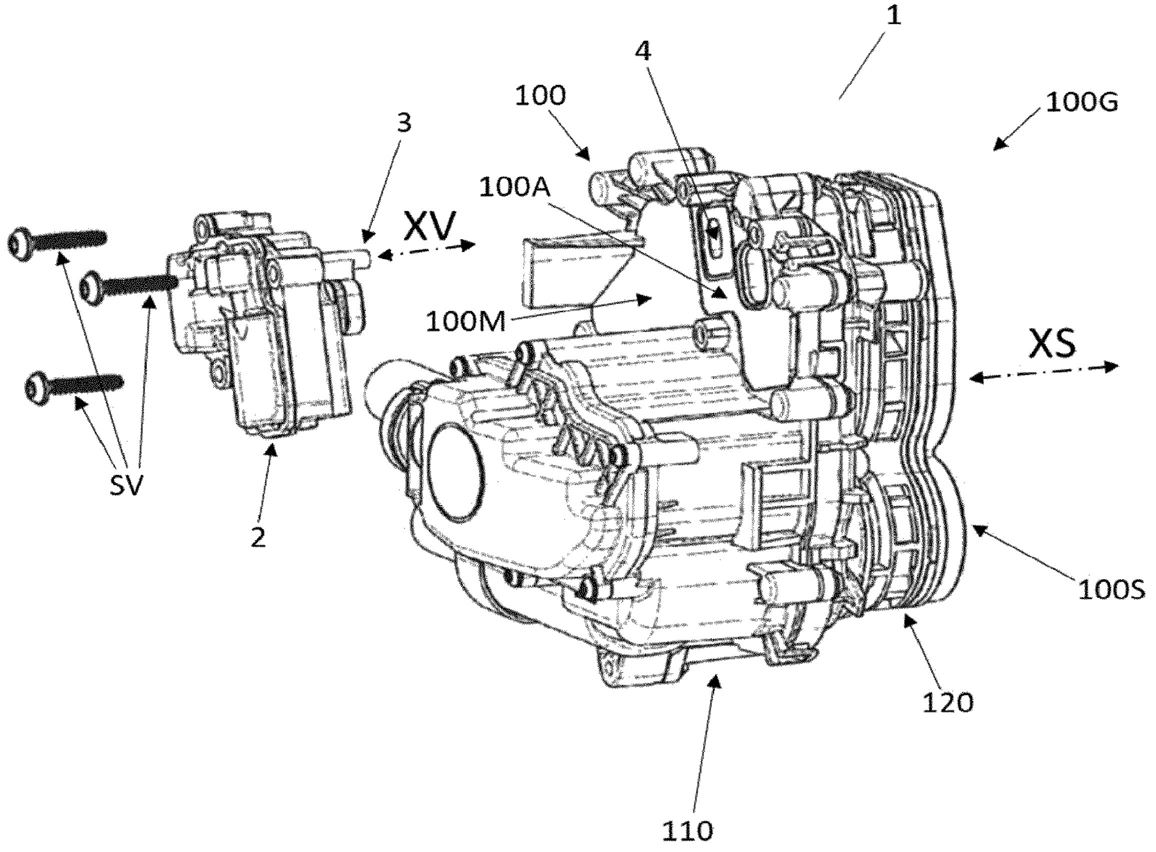
FIG. 3A shows a perspective representation (exploded view) of a further exemplary embodiment of a socket according to the invention.

FIG. 3A shows a perspective representation (exploded view) of a further exemplary embodiment of a socket according to the invention 1.

Here, the socket 1 also comprises a first housing part 110 and a second housing part 120, wherein the second housing part 120 has a connector face 100G with a connector portion 100S.

The first housing part 110 of the housing 100 is configured and designed on the outside 100A to detachably mount an actuator 2. The mounting of the actuator 2 preferably takes place at least in sections by means of a plug connection between a connector section on the actuator 2 and a mating connector section on the outside 100A of the first housing part 110, as well as by means of screw connections SV.

As already explained, the actuator 2 comprises the locking element 3, here in the form of a cylindrical locking bolt 3, at least for translatory actuation in the actuation direction XV.

The actuation direction XV of the locking element 3 for a translatory movement is preferably substantially parallel to the connector direction XS of the socket 1 with which a plug connection with a connector (not shown in FIG. 3A) can be formed.

Figure 3B:
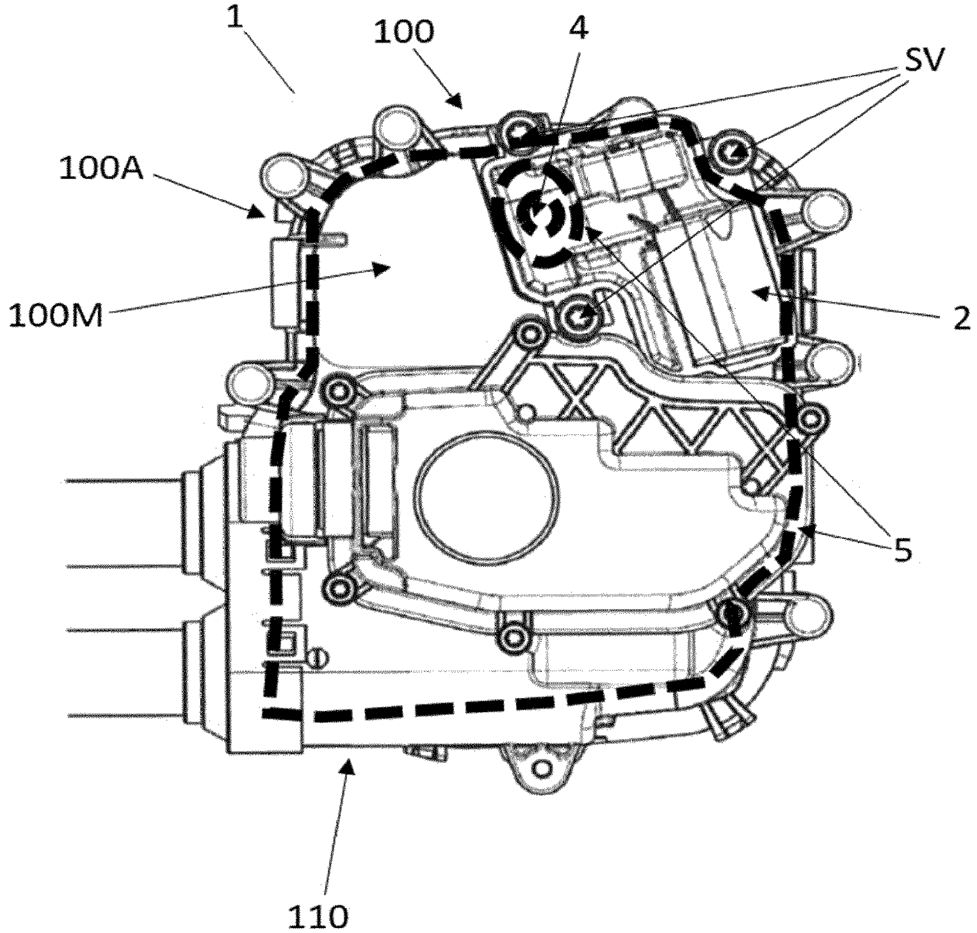
FIG. 3B shows a side view of the exemplary embodiment of the socket according to the invention as shown in FIG. 3A.

FIG. 3B shows a rear view of the exemplary embodiment of the socket 1 according to the invention, as shown in FIG. 3A.

The mounting section 100M located on the outside 100A of the housing 100, that is to say of the housing part 110, is easily visible lateral to the actuator 2, said mounting section 100M being for receiving or mounting further components and elements, such as sensors for temperature measurement. Furthermore, from the view in the connector direction XS of the socket 1 as shown in FIG. 3B, it can be learned that the actuator 2 and the locking element 3 are arranged in the passage 4 within the contour or projection area of the sealing region 5—here shown by dashed lines—on or in the housing 100. For more detailed illustration, the contour or the cross section of the passage 4 through the first housing part 110 and the second housing part 120 is also shown in dashed lines.

Figure 4A:
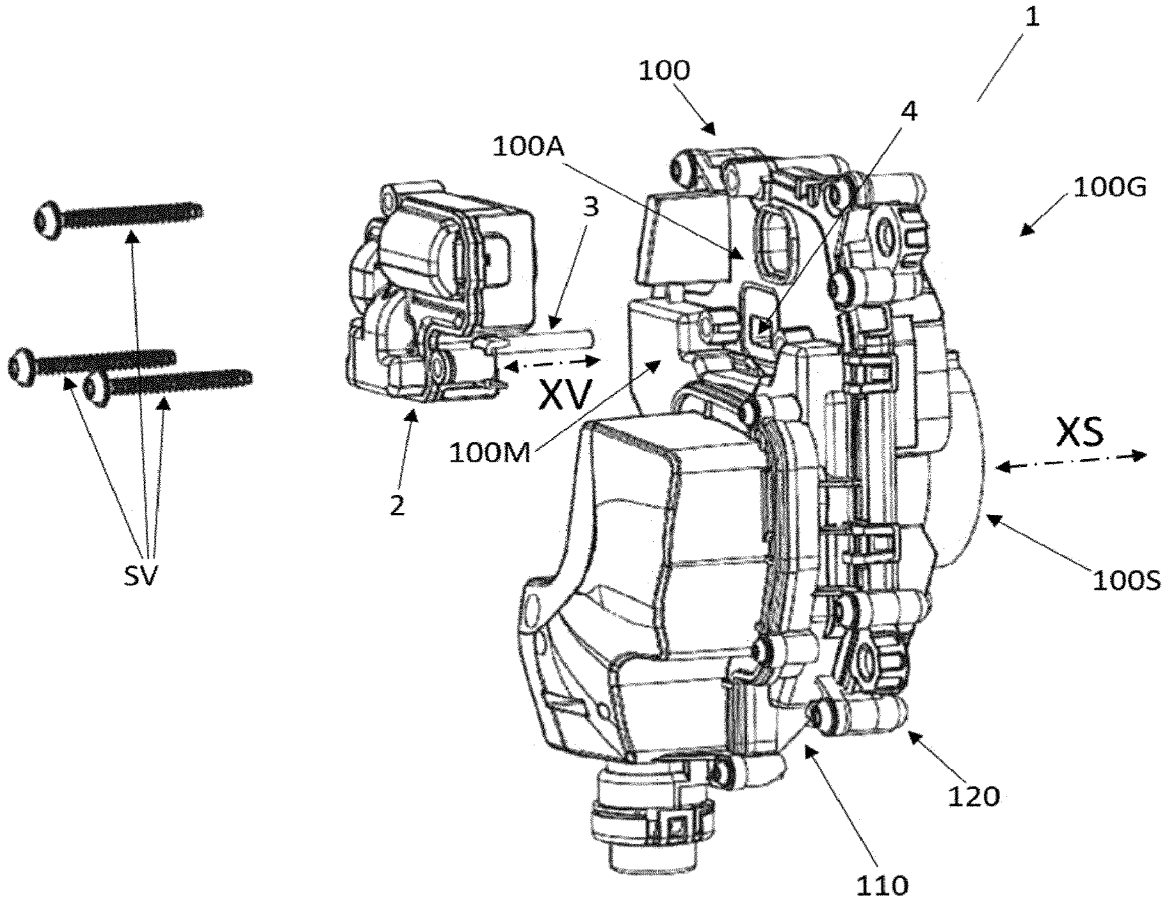
FIG. 4A shows a perspective representation (exploded view) of a further exemplary embodiment of a socket according to the invention.

FIG. 4A shows a perspective representation (exploded view) of a further exemplary embodiment of a socket 1 according to the invention, which—just like the preceding exemplary embodiments—is furnished with a first housing part 110 and a second housing part 120.

The actuator 2 can be detachably mounted on the outside 100A of the housing 100 with the locking element 3 in such a way that the locking element 3 is located in the vicinity of the wall section of the connector section 100S of the connector face 100G due to the arrangement of the passage 4. In other words, the passage 4 and the locking element 3 guided in the passage 4 are arranged more or less in the middle or centrally situated region of the socket 1.

Figure 4B:
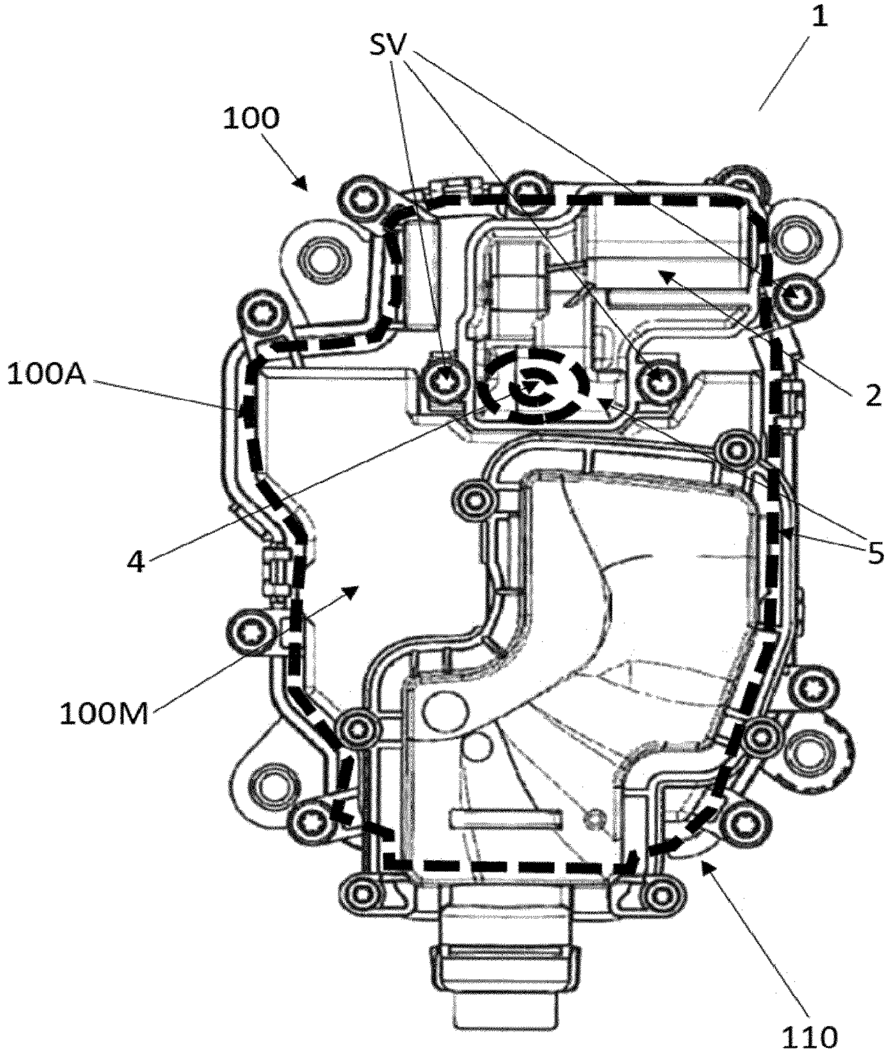
FIG. 4B shows a rear view of the exemplary embodiment of the socket according to the invention as shown in FIG. 4A.

FIG. 4B shows a rear view of the exemplary embodiment of the socket 1 according to the invention, as shown in FIG. 4A.

Figure 5A:
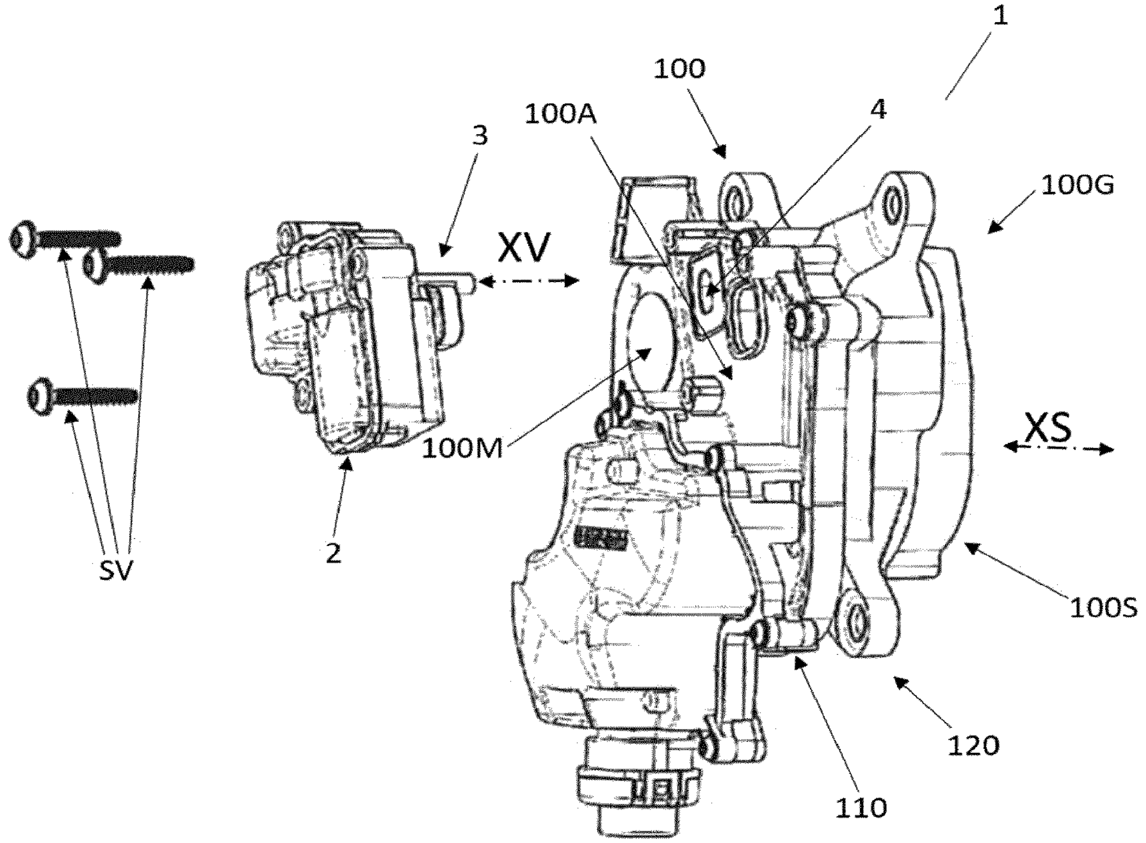
FIG. 5A shows a perspective representation (exploded view) of a further exemplary embodiment of a socket according to the invention.

FIG. 5A shows a perspective representation (exploded view) of a further exemplary embodiment of a socket according to the invention 1.

Figure 5B:
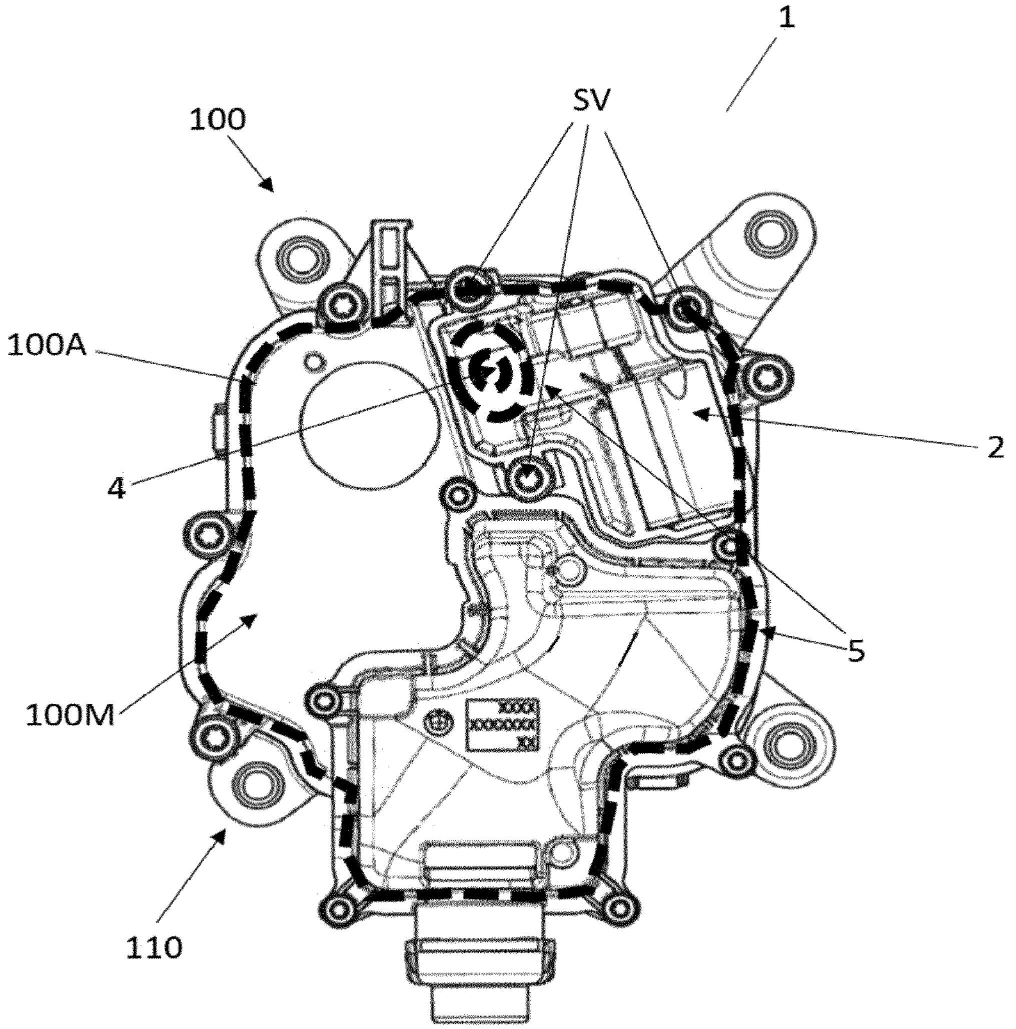
FIG. 5B shows a side view of the exemplary embodiment of the socket according to the invention as shown in FIG. 5A.

FIG. 5B shows a side view of the exemplary embodiment of the socket 1 according to the invention as shown in FIG. 5A, in which, in turn, the position of the passage 4 through the housing 100 and the course of the sealing region 5 of the housing 100 are indicated, that is to say are shown in dashed lines.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

1 Socket
2 Actuator
3 Locking element
4 Passage
5 Sealing region
5B, 5C Seal
6 Contact element
100 Housing
101 Opening
102 Opening
110 First housing part
120 Second housing part
100A Outside
100G Connector face
100M Mounting portion
100S Connector section
XS Plug-in direction
XV Actuation direction

The invention claimed is:

1. A socket, comprising:
a housing; and
an actuator detachably mountable or mounted on an outside of the housing, and configured to actuate a locking element for locking the socket to a connector in a locking position,
wherein the housing comprises a passage configured to guide the locking element through the housing,
wherein the passage is configured to penetrate the housing and is arranged within a sealing region of the housing,
wherein the housing comprises a first housing part and a second housing part detachably mountable on the first housing part, and
wherein the passage is configured to penetrate the first housing part and the second housing part.

2. The socket of claim 1, wherein the passage forms at least two openings on the outside of the housing.

3. The socket of claim 2, wherein the at least two openings are arranged opposite one another.

4. The socket of claim 1, wherein the passage is configured to penetrate the housing, at least in sections, substantially parallel or oblique to a plug-in direction of the socket, and/or the locking element is configured to be operable, at least in sections, substantially parallel or at an angle to the plug-in direction of the socket.

5. The socket of claim 1, wherein the sealing region comprises a dry region, in which is arranged at least a portion of at least one contact element for transmitting electrical energy and/or electrical signals.

6. The socket of claim 1, wherein, in a view, the actuator is detachably mountable and/or is arranged on the outside of the housing within a contour of the housing.

7. The socket of claim 6, wherein the view is a side view in the plug-in direction of the socket, and
wherein the actuator is detachably mountable and/or is arranged on the outside of the housing within a contour of the sealing region.

8. The socket of claim 1, further comprising:
at least one seal configured to form the sealing region between the first housing part and the second housing part.

9. The socket of claim 1, wherein the actuator is operable and/or controllable via at least one contact element of the socket.

10. The socket of claim 1, wherein the locking element is cylindrical or pin-shaped at least in sections.

11. The socket of claim 1, wherein the housing has on the outside, a mounting portion configured for mounting of an assembly.

12. The socket of claim 11, wherein the mounting portion is on the outside of the housing opposite a connector face of the socket, and wherein the mounting portion is arranged adjacent to the actuator.

13. The socket of claim 1, wherein at least one seal is arranged between the actuator and the outside of the housing.

14. The socket of claim 13, wherein the at least one seal is arranged circumferentially around an opening of the passage.

15. The socket of claim 1, wherein the passage is integrally formed as one piece, at least in sections.

16. The socket of claim 15, wherein the passage is formed integrally as one piece with a first housing part and/or with a second housing part, and wherein the passage comprises an insulating material.

17. The socket of claim 1, wherein a cross section of the passage is substantially round and/or oval and/or rectangular at least in sections.

18. An arrangement, comprising:

the socket of claim 1; and a connector.

19. A vehicle, comprising:

the socket of claim 1.

* * * * *